M. SCHUBERT.
BALL BEARING.
APPLICATION FILED DEC. 10, 1912.
1,067,943. Patented July 22, 1913.
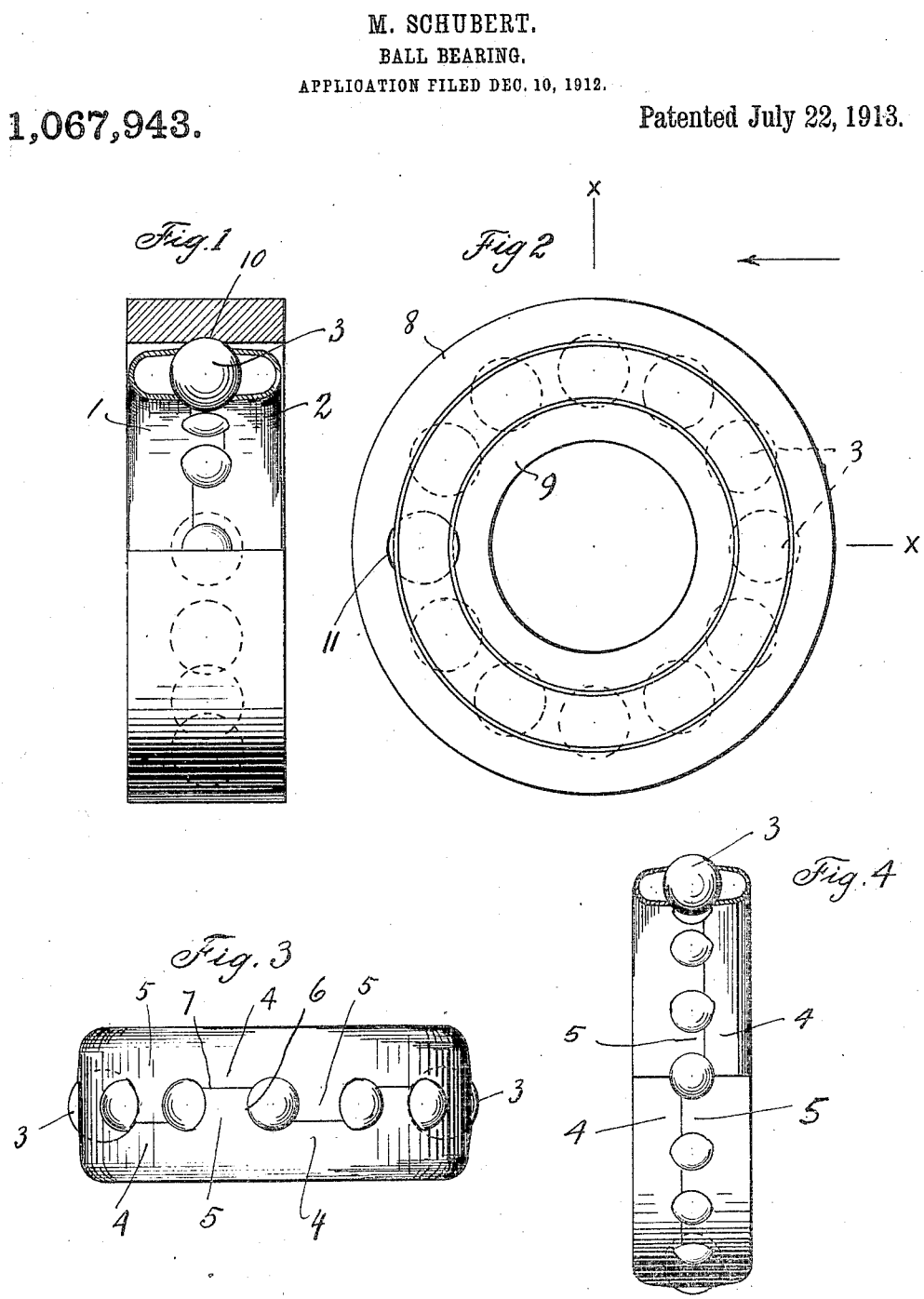
WITNESSES
Aug. Kuhn
Jos. Maier
INVENTOR
Martin Schubert
By Robt. Klotz
Atty.

UNITED STATES PATENT OFFICE.

MARTIN SCHUBERT, OF CHICAGO, ILLINOIS, ASSIGNOR OF ONE-THIRD TO SAMUEL LINDY, OF CHICAGO, ILLINOIS.

BALL-BEARING.

1,067,943.  Specification of Letters Patent.  Patented July 22, 1913.

Application filed December 10, 1912. Serial No. 735,934.

*To all whom it may concern:*

Be it known that I, MARTIN SCHUBERT, a subject of the Emperor of Austria-Hungary, and residing at Chicago, in the county of Cook and State of Illinois, have invented a new and useful Improvement in Ball-Bearings, of which the following is a full and complete specification.

The object of this invention is the production of a retainer or cage for rolls, whose purpose is to properly space and position the balls in the inclosing raceway, which is of simple construction, is readily assembled, and whose parts after assembling are locked in place by the balls themselves.

In general, the retainer consists of an annular structure, or other shape, whose thickness is less than the balls it contains, and which is made in two sections to permit the insertion of the balls. The dividing line of the two sections does not follow the line of the greatest diameter of the balls, however, but lies partly on one side and partly on the other side of this middle line. With such a construction, each section is provided with tongues which partly surround the balls and in this manner are locked to the balls and so to each other.

This construction is fully illustrated in the accompanying drawing, in which—

Figure 1 is an end view of the ball bearing, shown partly in section. Fig. 2 is a side view of the complete bearing. Fig. 3 is an end view of the retainer and its inclosed balls, showing one form in which the tongues alternate on each section. Fig. 4 is an end view of another form of retainer, shown partly in section, in which all the tongues on the exterior are attached to one section and all the tongues on the interior of the retainer are attached to the other section.

The two sections of which the retainer is composed are denoted by the numerals 1 and
2. In the preferred form of construction shown, these sections are made of sheet steel, their interior and exterior faces being a distance apart somewhat less than the diameter of the balls 3, and the connecting edges being shown rounded, the cross section of each one therefore being practically U-shaped. The balls 3 rotate in openings formed partly in the faces of one section and partly in the faces of the other section as shown in the drawing. Tongues 4 and 5 are thus formed on the meeting edges of the sections and which are integral therewith. Tongues 4, however, are of a length less than the radius of the ball openings and the tongues 5, formed on the complementary section, are of a length greater than the radius of the ball openings. The sides 6 of the tongues 5 are therefore diverging toward the meeting edges 7 and the edges 7 are longer than the distance between the openings at their greatest diameter. The result is that when the sections are assembled with the balls 3 in the openings, the tongues 5 can not be drawn past the balls and therefore the sections are locked to the balls. As both sections carry the tongues 5, both sections are locked to the balls and so to each other.

The raceway in which the balls revolve is formed of two sleeves 8 and 9, shown in the drawing. The distance between these sleeves is somewhat less than the diameter of the balls and somewhat greater than the thickness of the retainer described above. Grooves 10 are formed in these sleeves to give the proper clearance for the balls and connecting with them are channels leading to one of the sides of the sleeves as shown in Fig. 2. These channels 11 permit the feeding of the rolls into the raceway formed by the grooves 10 in the sleeves 8 and 9.

In assembling this ball bearing, the balls are first fed into the raceway formed in the sleeves 8 and 9 until the right number have been inserted. A section of the retainer is then forced over the balls. As the distance between the sleeves is somewhat greater than the thickness of the retainer, there is space enough to permit the tongues to spring over the balls 3, and so partly surround them.
The other section is then forced on and the bearing is complete.

From the construction thus fully described and shown, it will be seen that it is a bearing of minimum number of parts, is readily made and assembled and can not come apart after assembling. It is obvious, however, that the invention is not limited to the embodiment herein shown and described. Though it is not deemed advisable, it is possible with the construction shown in Fig. 4 to omit one of the sections and depend upon one section provided with the tongues 5 to space the balls and to be held in place by the balls. Further the construction is not limited to bearings but may be used for spacing balls interposed between rectilinear or other curvilinear surfaces.

What I claim is:

1. A ball bearing retaining annulus consisting of companion sections formed with ball retaining tongues of unequal lengths and adapted to interlock with the balls to be retained to lock the sections to each other.

2. A ball bearing retaining annulus consisting of hollow annular sections, each section being formed with ball retaining tongues, a part of the tongues of each section being long and a part of said tongues being short, the long tongues of one section being adapted to register with the short tongues of the other section, said tongues having edge portions to engage the balls to be retained and adapted to interlock with said balls to lock the sections to each other.

In witness whereof I hereunto subscribe my name in the presence of two witnesses.

MARTIN SCHUBERT.

Witnesses:
 ROBT. KLOTZ,
 DAVID B. JOHNSON.

---

Copies of this patent may be obtained for five cents each, by addressing the "Commissioner of Patents, Washington, D. C."